United States Patent
Handa (10) Patent No.: US 12,394,142 B2
(45) Date of Patent: Aug. 19, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masahiro Handa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 180 days.

(21) Appl. No.: 18/060,650

(22) Filed: Dec. 1, 2022

(65) Prior Publication Data
US 2023/0177767 A1 Jun. 8, 2023

(30) Foreign Application Priority Data
Dec. 8, 2021 (JP) ................. 2021-199234

(51) Int. Cl.
*G06T 15/20* (2011.01)
*G06T 15/04* (2011.01)
*G06V 10/25* (2022.01)

(52) U.S. Cl.
CPC ............ *G06T 15/205* (2013.01); *G06T 15/04* (2013.01); *G06V 10/25* (2022.01)

(58) Field of Classification Search
CPC ........... G06T 2207/10016; G06T 17/00; G06T 15/20; G06T 2210/56; G06T 7/564; G06T 11/80; G06T 19/00; G06T 1/0007; G06T 15/205; G06T 15/04; G06V 20/64; G06V 20/46; G06V 10/806; G06V 10/25; H04N 23/80; H04N 13/117; H04N 23/60;
(Continued)

(56) References Cited

U.S. PATENT DOCUMENTS

| 10,855,972 B2* | 12/2020 | Aurongzeb | .......... H04N 13/189 |
| 2018/0349066 A1* | 12/2018 | Nakamura | ............ G06F 3/1203 |
| 2020/0327724 A1* | 10/2020 | Furukawa | ............ H04N 13/243 |

FOREIGN PATENT DOCUMENTS

| JP | 2017-211828 A | | 11/2017 |
| JP | 2018-63500 A | | 4/2018 |
| KR | 20210012927 A | * | 2/2021 |

OTHER PUBLICATIONS

Laurentini (The Visual Hull Concept for Silhouette-Based Image Understanding, IEEE Trans. PAMI, vol. 16, No. 2, Feb. 1994, pp. 150-162) (Year: 1994).*

* cited by examiner

*Primary Examiner* — Kee M Tung
*Assistant Examiner* — Biao Chen
(74) *Attorney, Agent, or Firm* — Carter, DeLuca & Farrell LLP (57) ABSTRACT

An image processing apparatus obtains multiple silhouette images corresponding to the images captured by multiple image capturing apparatuses for corresponding frames forming a moving image; in a case where an abnormality is detected in at least one of the plurality of images, identifies a frame and an image capturing apparatus corresponding to the image in which the abnormality is detected; and generates three-dimensional shape data of the object by using the plurality of images, wherein in a case of generating the three-dimensional shape data in a plurality of frames corresponding to a period from detecting the abnormality to satisfying a predetermined condition, the three-dimensional shape data is generated by not using the image corresponding to the identified image capturing apparatus.

14 Claims, 6 Drawing Sheets

(58) Field of Classification Search
CPC .............. H04N 21/2187; H04N 23/90; H04N 21/2404; H04N 23/00
See application file for complete search history.

IMAGE PROCESSING APPARATUS, IMAGE PROCESSING METHOD, AND STORAGE MEDIUM

CROSS REFERENCE TO RELATED APPLICATIONS

This application claims the benefit of, and priority to, Japanese Patent Application No. 2021-199234, filed on Dec. 8, 2021, the entire contents of which are hereby incorporated herein by reference in their entirety.

BACKGROUND OF THE INVENTION

Field of the Disclosure

The present disclosure relates to generation of data based on a captured image.

Description of the Related Art

There is a method of generating three-dimensional shape data (hereinafter, referred to as a three-dimensional model in some cases), which represents a three-dimensional shape of an object existing in an image capturing space, based on multiple images captured by multiple image capturing apparatuses arranged around the image capturing space.

In Japanese Patent Laid-Open No. 2017-211828, there is described a method of generating a three-dimensional model of an object as a foreground in visual hull by extracting a foreground region from images obtained by image-capturing by multiple cameras.

In Japanese Patent Laid-Open No. 2018-63500, there is described that a three-dimensional model is generated by without using a foreground image corresponding to a camera that is detected as abnormal.

In a case of comparing a three-dimensional model that is generated by using foreground images corresponding to all the arranged cameras with a three-dimensional model that is generated by without using a foreground image corresponding to some of the cameras, even in a case of a still object, the shapes may be partially different from each other.

For example, assuming that there occurs intermittently a lack of a frame that should be outputted from one camera; in this case, by the method disclosed in Japanese Patent Laid-Open No. 2018-63500, if the frames are outputted normally from all the cameras, the three-dimensional model is generated by using foreground images corresponding to all the cameras, and if there occurs a lack of a frame in one camera, the three-dimensional model is generated by without using a foreground image from the concerned camera. Thus, by the method disclosed in Japanese Patent Laid-Open No. 2018-63500, even in a case of a still object, three-dimensional models in partially different shapes may be generated alternately in a short period. In this case, if the generated three-dimensional models are displayed in the order of the generation to be displayed as a moving image, flickering occurs. Thus, there is a risk that the moving image may be an image that provides a viewer a feeling of strangeness.

SUMMARY OF THE DISCLOSURE

An image processing apparatus of the present disclosure comprising: one or more memories storing instructions; and one or more processors executing the instructions to: obtain a plurality of images representing a region of an object, the plurality of images corresponding to a plurality of image capturing apparatuses and corresponding to frames forming a moving image; in a case where an abnormality is detected in at least one of the plurality of images, identify a frame and an image capturing apparatus corresponding to the image in which the abnormality is detected; and generate three-dimensional shape data of the object by using the plurality of images, wherein in a case of generating the three-dimensional shape data in a plurality of frames corresponding to a period from detecting the abnormality to satisfying a predetermined condition, the three-dimensional shape data is generated by not using the image corresponding to the identified image capturing apparatus but using the image corresponding to an image capturing apparatus other than the identified image capturing apparatus.

Further features of the present disclosure will become apparent from the following description of exemplary embodiments with reference to the attached drawings.

DESCRIPTION OF THE EMBODIMENTS

Details of a technique of the present disclosure are described below based on embodiments with reference to the appended drawings. Note that, configurations described in the embodiments below are merely an example, and the technique of the present disclosure is not limited to the illustrated configurations.

Additionally, terms with reference numerals in which only alphabets assigned after the numerals are different from each other indicate different instances of devices having the same function. In a case of referring to either one of the devices having the same function, the alphabet in the reference numeral may be omitted.

Embodiment 1

Figure 1:
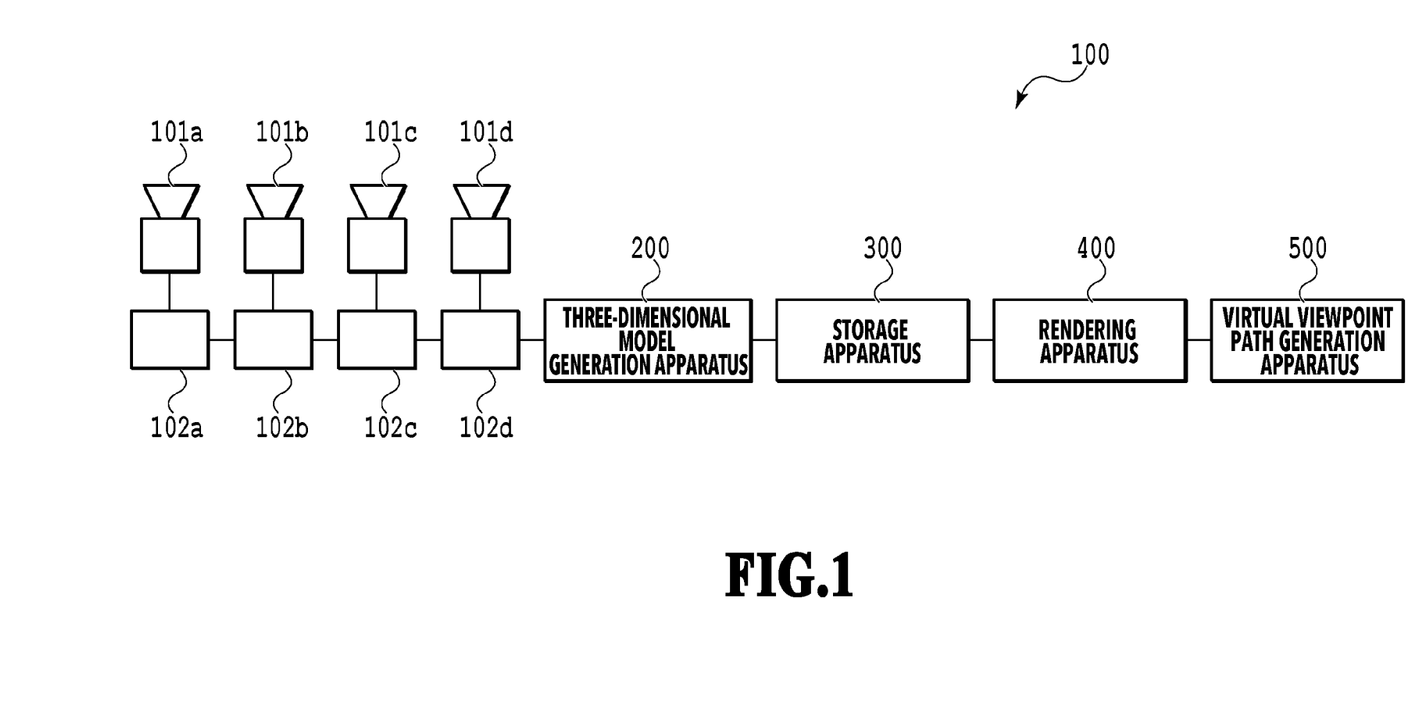
FIG. 1 is a diagram illustrating a configuration of an image generation system.

[System Configuration]
FIG. 1 is a diagram illustrating an example of an image processing system 100 that generates a virtual viewpoint image. The virtual viewpoint image is an image that represents an appearance from a virtual viewpoint regardless of an actual viewpoint from an image capturing apparatus. The virtual viewpoint image is generated by using multiple images obtained by image-capturing from multiple viewpoints in clock synchronization by disposing multiple image capturing apparatuses in different positions. With the virtual viewpoint image, a user can view and browse scenes of highlights of sports such as soccer from various angles, and this can give the user higher realistic sensation than a normal captured image. Note that, the virtual viewpoint image may be either of a moving image and a still image. In the following embodiments, descriptions are given assuming that the virtual viewpoint image is a moving image.

The image processing system 100 includes image capturing apparatuses 101a to 101d, foreground extraction apparatuses 102a to 102d connected to the image capturing apparatuses 101a to 101d, respectively, a three-dimensional model generation apparatus 200, a storage apparatus 300, a rendering apparatus 400, and a virtual viewpoint path generation apparatus 500.

The image capturing apparatuses 101a to 101d are apparatuses such as a digital video camera that captures an image (moving image). For example, the image capturing apparatuses 101a to 101d each receive GPS and an external synchronization signal, and all the apparatuses perform image-capturing concurrently. The image capturing apparatuses 101a to 101d image-capture an object existing in an image capturing environment at various angles from multiple directions and output image data of the captured image to the foreground extraction apparatuses 102a to 102d. FIG. 1 illustrates an example in which four image capturing apparatuses 101a to 101d are arranged; however, the number of the image capturing apparatuses in the image processing system 100 is not limited to four. The number of the arranged image capturing apparatuses is arbitrary. Additionally, the image capturing apparatuses 101a to 101d may be an apparatus that captures not only an image but also other sensor information such as sound. Moreover, unless stated otherwise, in a case of referring to either one of the image capturing apparatuses 101a to 101d, it may be described as an image capturing apparatus 101 by omitting the alphabet in the reference numeral.

The foreground extraction apparatuses 102a to 102d are image processing apparatuses corresponding to the image capturing apparatuses 101a to 101d, respectively. The captured image that is obtained as a result of the image-capturing by the image capturing apparatus 101 is inputted to the corresponding one of the foreground extraction apparatuses 102a to 102d. The foreground extraction apparatuses 102a to 102d each perform image processing on the inputted captured image. The image processing performed by the foreground extraction apparatuses 102a to 102d includes processing to extract a foreground region indicating a silhouette of the object included in the inputted captured image. Then, a silhouette image that indicates the foreground region and a non-foreground region included in the captured image with binarization is generated. Additionally, a texture image of the object as the foreground is generated. The silhouette image of the foreground and the texture image of the foreground are collectively called an object image or foreground data.

The object represented as the foreground in the captured image is an object that allows for a view from an arbitrary angle from the virtual viewpoint and, for example, indicates a person existing on a field of a stadium. Alternatively, the object may be a body with a predetermined image pattern such as a ball or a goal. Additionally, the object may be a moving body or may be a still body. What kind of object is to be extracted as the foreground can be designated in advance by the user and the like.

A method of extracting the foreground from the captured image includes a method using background difference information. In this method, for example, a state of an image capturing environment in which no object exists is image-captured in advance and held as a background image. Then, in this method, a region in which a difference value of a pixel value between the captured image and the background image is greater than a threshold is determined as the foreground. Note that, a method of extracting the foreground is not limited to the method using the background difference information. In addition, as a method of extracting the foreground, a method using disparity, a method using feature amount, a method using machine learning, or the like may be used. The generated foreground data is outputted to the three-dimensional model generation apparatus 200.

Note that, FIG. 1 illustrates an example in which the four foreground extraction apparatuses 102a to 102d are arranged; however, the number of the foreground extraction apparatuses is not limited to four. The number of the arranged foreground extraction apparatuses may be arbitrary. Additionally, in the present embodiment, the foreground extraction apparatus 102 and the image capturing apparatus 101 are different apparatuses; however, they may be an integral apparatus or may be implemented with different apparatuses for each function. Unless stated otherwise, in a case of referring to either one of the foreground extraction apparatuses 102a to 102d, it may be described as a foreground extraction apparatus 102 by omitting the alphabet in the reference numeral.

The three-dimensional model generation apparatus 200 is an image processing apparatus implemented with a computer such as a PC, a work station, and a server. The three-dimensional model generation apparatus 200 obtains the foreground data based on the captured images (frames) obtained as a result of image-capturing of different ranges of field of view from the corresponding foreground extraction apparatuses 102a to 102d. Then, three-dimensional shape data of the object is generated based on the foreground data. The three-dimensional shape data of the object represented by a voxel in the three-dimensional shape data is also called a three-dimensional model. The generated three-dimensional model is outputted as a point cloud format that is an aggregate of voxels on a three-dimensional space. In addition, the format of the three-dimensional model may be a mesh format or another different format.

The storage apparatus 300 is an apparatus implemented with a computer such as a PC, a work station, and a server. The storage apparatus 300 is an apparatus that stores point cloud format data that is the three-dimensional model generated by the three-dimensional model generation apparatus 200 and the foreground data generated by the foreground extraction apparatus 102. A storage unit 301 that stores the data in the storage apparatus 300 may be implemented with either of a volatile memory, a non-volatile memory, a hard disk, and an SSD. Note that, in the present embodiment, descriptions are given assuming that the data outputted from the three-dimensional model generation apparatus 200 is stored in the storage unit 301 of the storage apparatus 300. In addition, the three-dimensional model generation apparatus 200 may directly output the data to the rendering apparatus 400. In this case, the image processing system 100 may have a configuration not including the storage apparatus 300.

The rendering apparatus 400 is an image processing apparatus implemented with a computer such as a PC, a work station, and a server. The virtual viewpoint image is generated based on the point cloud format data (three-dimensional model) and the foreground data stored in the storage apparatus 300 and a virtual viewpoint path generated by the later-described virtual viewpoint path generation apparatus 500.

The virtual viewpoint path includes data such as a location, an angle of view, a movement speed, and a reproduction speed of a virtual camera. Based on the data of the virtual viewpoint path, the rendering apparatus 400 obtains from the storage apparatus 300 the point cloud format data (three-dimensional model) for generating an image corresponding to the viewpoint and the texture image included in the foreground data. Then, the virtual viewpoint image is generated by projecting the texture of the foreground data to the three-dimensional shape indicated by the point cloud format data.

The virtual viewpoint path generation apparatus 500 is an apparatus implemented with a computer such as a PC, a work station, and a server. The virtual viewpoint path generation apparatus 500 is an apparatus that generates information on the virtual viewpoint (virtual viewpoint path information) that is the viewpoint from the virtual camera for generating the virtual viewpoint image and outputs the generated information on the virtual viewpoint to the rendering apparatus 400.

The three-dimensional model generation apparatus 200, the foreground extraction apparatus 102, the storage apparatus 300, the rendering apparatus 400, and the virtual viewpoint path generation apparatus 500 are connected to each other through a LAN network. Descriptions are given assuming that a network topology of the present embodiment is daisy chain connection; however, the network topology is not limited to the daisy chain connection. Star, bus, or mesh type connection through a relay device such as a hub may be applicable. Additionally, the connection between the apparatuses may not be through only the LAN network but also through another wired connection, wireless LAN, public wireless network, or the Internet. Moreover, a serial digital interface (SDI), a digital visual interface (DVI), or the like that is an interface for image transmission may be applicable.

[Hardware Configuration]

Figure 2:
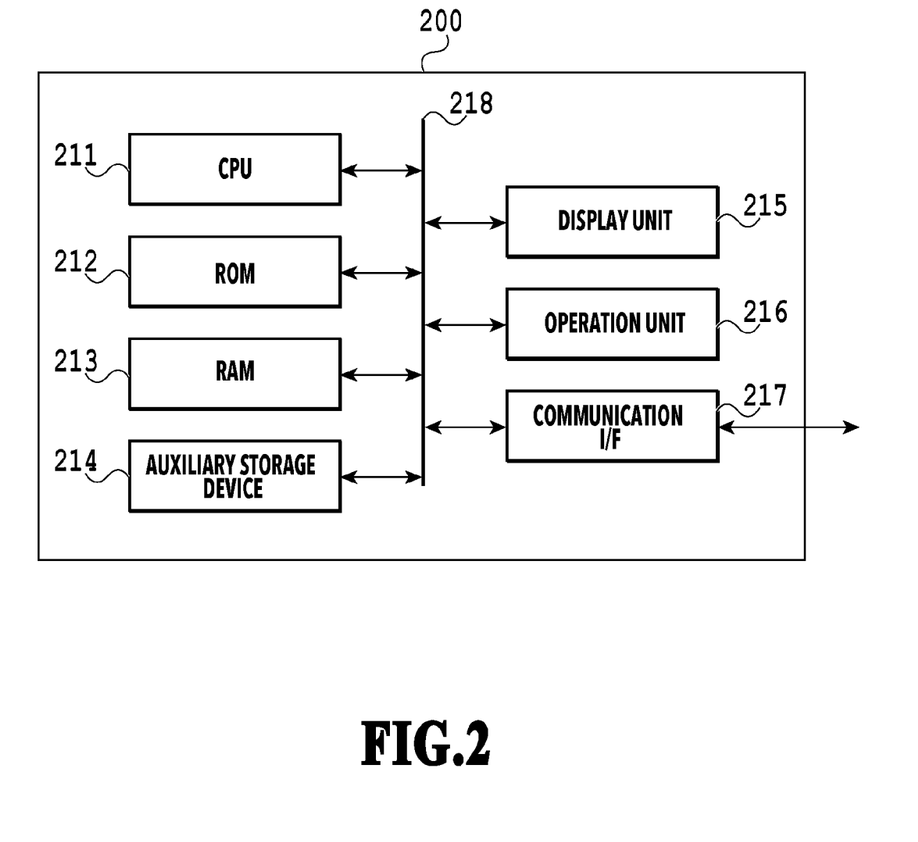
FIG. 2 is a diagram illustrating a hardware configuration of a three-dimensional model generation device.

FIG. 2 is a diagram illustrating a hardware configuration of the three-dimensional model generation apparatus 200. Note that, hardware configurations of the foreground extraction apparatus 102, the rendering apparatus 400, and the virtual viewpoint path generation apparatus 500 are similar to the configuration of the three-dimensional model generation apparatus 200 described below.

The three-dimensional model generation apparatus 200 includes a CPU 211, a ROM 212, a RAM 213, an auxiliary storage device 214, a display unit 215, an operation unit 216, a communication I/F 217, and a bus 218.

Figure 3:
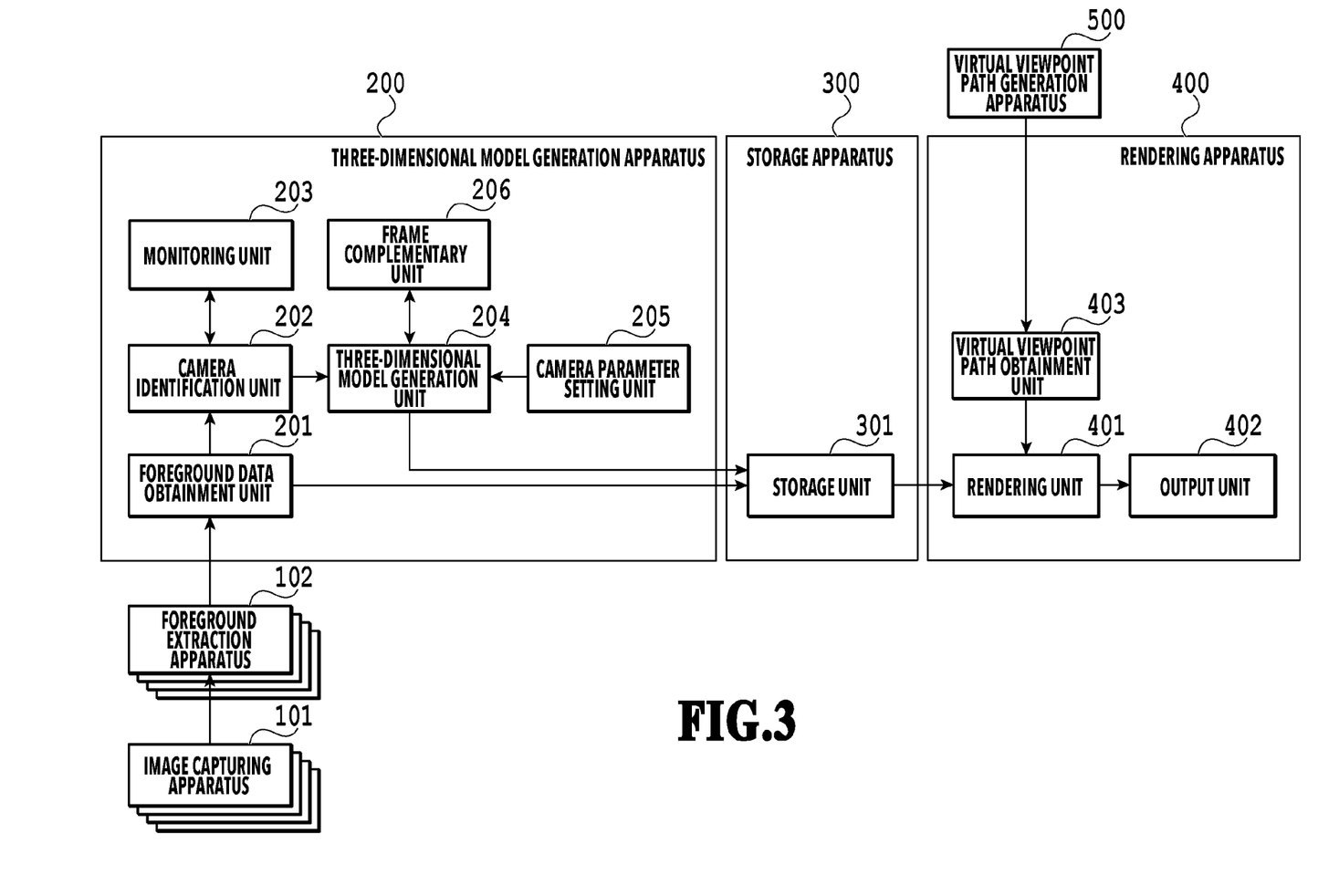
FIG. 3 is a block diagram illustrating a functional configuration of the three-dimensional model generation device.

The CPU 211 implements the functions illustrated in FIG. 3 by controlling an entirety of the three-dimensional model generation apparatus 200 by using computer programs and data stored in the ROM 212 and the RAM 213. Note that, the three-dimensional model generation apparatus 200 may include one or more pieces of dedicated hardware different from the CPU 211, and at least a part of the processing by the CPU 211 may be executed by the dedicated hardware. An example of the dedicated hardware may include an application specific integrated circuit (ASIC), a field programmable gate array (FPGA), and a digital signal processor (DSP), and the like.

The ROM 212 stores a program and the like that require no change. The RAM 213 temporarily stores a program and data supplied from the auxiliary storage device 214, data supplied from outside through the communication I/F 217, and the like. The auxiliary storage device 214 is formed of a hard disk drive or the like, for example, and stores various data such as image data and sound data.

The display unit 215 is formed of a liquid crystal display, an LED, and the like, for example, and displays a graphical user interface (GUI) and the like for the user to operate the three-dimensional model generation apparatus 200. The operation unit 216 is formed of a keyboard, a mouse, a joystick, a touch panel, and the like, for example, and inputs various instructions to the CPU 211 in response to the operation by the user. The CPU 211 operates as a display control unit that controls the display unit 215 and an operation control unit that controls the operation unit 216. In the present embodiment, descriptions are given assuming that the display unit 215 and the operation unit 216 exist inside the three-dimensional model generation apparatus 200; however, at least one of the display unit 215 and the operation unit 216 may exist as a different device outside the three-dimensional model generation apparatus 200.

The communication I/F 217 is used for communication of the three-dimensional model generation apparatus 200 with an external device. For example, in a case where the three-dimensional model generation apparatus 200 is connected to the external device with wire, a cable for communication is connected to the communication I/F 217. In a case where the three-dimensional model generation apparatus 200 has a function of wireless communication with the external device, the communication I/F 217 includes an antenna. The bus 218 transmits information by connecting the units in the three-dimensional model generation apparatus 200.

[Functional Configuration]

FIG. 3 is a block diagram illustrating functional configurations of the three-dimensional model generation apparatus 200, the storage apparatus 300, and the rendering apparatus 400. Functions of the apparatuses included in the image processing system 100 are described with reference to FIG. 3.

The three-dimensional model generation apparatus 200 includes a foreground data obtainment unit 201, a camera identification unit 202, a monitoring unit 203, a three-dimensional model generation unit 204, a camera parameter setting unit 205, and a frame complementary unit 206.

The foreground data obtainment unit 201 obtains the multiple pieces of the foreground data corresponding to the image capturing apparatuses 101 respectively from the multiple foreground extraction apparatuses 102. Note that, in the present embodiment, descriptions are given assuming that the multiple pieces of the foreground data from the multiple foreground extraction apparatuses 102 are obtained by the single three-dimensional model generation apparatus 200; however, the number of the apparatus that obtains the multiple pieces of the foreground data is not limited to one. In a case where multiple three-dimensional model generation apparatuses 200 are arranged on the network, the multiple pieces of the foreground data may be obtained by the multiple three-dimensional model generation apparatuses 200.

The camera identification unit 202 checks the foreground data obtained from the multiple foreground extraction apparatuses 102 and identifies whether there is foreground data that is not obtained out of the multiple pieces of the foreground data corresponding to the image capturing apparatuses 101a to 101d. That is, although the foreground data obtainment unit 201 usually obtains the multiple pieces of the data corresponding to the multiple image capturing apparatuses 101a to 101d for the corresponding frames, in some cases, foreground data corresponding to either one of the image capturing apparatuses may not be obtained. In this case, the camera identification unit 202 identifies the image capturing apparatus and the frame corresponding to the foreground data that is not obtained, and the foreground data that is not obtained is identified as abnormal foreground data.

Alternatively, the camera identification unit 202 may be configured to detect whether an abnormality occurs in relation to the obtainment of the foreground data and may identify the frame corresponding to the detected abnormality and the image capturing apparatus corresponding to the detected abnormality. In this case, a case where the foreground data cannot be obtained may be detected as an abnormality.

The camera identification unit 202 notifies the later-described monitoring unit 203 of the identified image capturing apparatus. Additionally, out of the foreground data transmitted from the multiple foreground extraction apparatuses 102, the camera identification unit 202 transfers the foreground data that is transmitted from the foreground extraction apparatus 102 corresponding to the image capturing apparatus other than a monitoring target of the monitoring unit 203 to the three-dimensional model generation unit 204. Moreover, the camera identification unit 202 transfers the foreground data transmitted from the foreground extraction apparatus 102 to the storage apparatus 300. In the process to transfer the foreground data to the storage apparatus 300, the camera identification unit 202 may add additional information to determine whether the foreground data is the monitoring target of the monitoring unit 203. Alternatively, the camera identification unit 202 may not transfer data that corresponds to the image capturing apparatus as the monitoring target of the monitoring unit 203 to the storage apparatus 300.

The monitoring unit 203 obtains information on the image capturing apparatus 101 identified by the camera identification unit 202 and registers the image capturing apparatus identified by the camera identification unit 202 as the monitoring target. Additionally, the monitoring unit 203 has a function to monitor the foreground data generated based on the captured image from the image capturing apparatus as the monitoring target. A method of registering as and excluding from the monitoring target is described later.

The frame complementary unit 206 generates complementary data that is data to be a replacement for the foreground data corresponding to the image capturing apparatus that is registered as the monitoring target by the monitoring unit 203. Based on the foreground data of the frame before the registration as the monitoring target or after the exclusion from the monitoring target out of the multiple pieces of the foreground data of the image capturing apparatus 101 as the monitoring target, the frame complementary unit 206 generates the complementary data to be a replacement for the foreground data corresponding to the image capturing apparatus. In this case, taking into consideration that the object as the foreground moves, the foreground region may be expanded to generate new complementary data. How much the foreground region is expanded may be set based on the movement amount and the like of the object as the foreground.

Additionally, in a case where the foreground data corresponding to the image capturing apparatus as the monitoring target could be obtained, the frame complementary unit 206 may generate the complementary data based on the foreground data. In this case, taking into consideration the possibility that the foreground data is abnormal, the foreground region may be expanded to generate the complementary data.

Moreover, instead of generating the complementary data based on other foreground data, a silhouette image in which an entire area represents the region of the object may be generated as complementary data of a silhouette image corresponding to the image capturing apparatus as the monitoring target.

The camera parameter setting unit 205 sets information on the multiple image capturing apparatuses 101 as camera parameters and outputs to the three-dimensional model generation unit 204. The camera parameters include a three-dimensional position on a global coordinate, orientation (orientation of the image capturing apparatus), a focal length, and a principal point (center on the captured image) of each image capturing apparatus 101. Note that, the camera parameters are measured and calculated by, for example, image-capturing a proofing pattern in advance for proofing the position of the image capturing apparatus and by performing coordinate conversion between a three-dimensional coordinate defined based on the proofing pattern and a two-dimensional image capturing unit coordinate.

The three-dimensional model generation unit 204 generates the three-dimensional model of the object by using the camera parameters outputted from the camera parameter setting unit 205 and the foreground data outputted from the camera identification unit 202. In a case where the frame complementary unit 206 generates the complementary data, the three-dimensional model generation unit 204 may generate the three-dimensional model by using the complementary data instead of the foreground data. In the present embodiment, descriptions are given assuming that a visual hull is used as a method of generating the three-dimensional model. The visual hull is described later.

The three-dimensional model generation unit 204 stores information on the generated three-dimensional model in the point cloud format into the storage apparatus 300. Additionally, out of the foreground data outputted from the camera identification unit 202, the three-dimensional model generation unit 204 stores the foreground data to be used to generate the virtual viewpoint image into the storage apparatus 300. The three-dimensional model generation unit 204 generates the three-dimensional model corresponding to the multiple frames forming the moving image obtained from the image capturing apparatus 101. Thus, the three-dimensional model generation unit 204 periodically performs processing to generate the three-dimensional data every time the foreground data based on the frame is obtained, and the point cloud format (three-dimensional model) and the foreground data are written into the storage unit 301 periodically.

The rendering apparatus 400 includes a rendering unit 401, an output unit 402, and a virtual viewpoint path obtainment unit 403.

The virtual viewpoint path obtainment unit 403 obtains the virtual viewpoint path information outputted from the virtual viewpoint path generation apparatus 500 and notifies the rendering unit 401 of the result. The virtual viewpoint path information includes data such as a position, an angle of view, and a movement speed of the virtual viewpoint desired by the user. The virtual viewpoint path information is generated in a format similar to that of the camera parameters.

The rendering unit 401 obtains the point cloud format and the foreground data stored in the storage apparatus 300 and the virtual viewpoint path information outputted from the virtual viewpoint path obtainment unit 403. The rendering unit 401 then performs processing to generate the virtual viewpoint image by rendering according to the point cloud format (three-dimensional model) and the foreground data and the virtual viewpoint path information. Specifically, the rendering unit 401 colors the three-dimensional shape indicated by the obtained point cloud format based on the texture image and outputs as a rendering result a state of projection to the two-dimensional coordinate from the virtual viewpoint based on the virtual viewpoint path information.

The output unit 402 converts the rendering result generated by the rendering unit 401 into an image format and outputs the rendering result. The image format for the output is a DVI; however, any image format may be applicable. In addition to a DVI, an SDI or a moving image file may be outputted with streaming onto the network.

The above-described functional units are implemented by the CPU of the corresponding device executing a predetermined program; however, it is not limited thereto. In addition, for example, hardware such as a graphics processing unit (GPU) for speeding up computing or a field programmable gate array (FPGA) may be used. The functional units may be implemented by cooperation of software and hardware such as a dedicated IC, or a part of or all the functions may be implemented only by hardware.

The storage apparatus 300 includes the storage unit 301. The storage unit 301 has a function to store the point cloud format generated by the three-dimensional model generation unit 204 and the foreground data obtained by the foreground data obtainment unit 201 in association with each other.

Note that, descriptions are given assuming that the functions of the units in FIG. 3 are implemented in the apparatuses described above; however, the apparatuses that implement the functions of the units are not limited thereto. For example, a mode in which the three-dimensional model generation apparatus 200 has all the functions described above may be applicable. Alternatively, the three-dimensional model generation apparatus 200 or the rendering apparatus 400 may include the storage unit 301. In this case, the three-dimensional model generation apparatus 200 and the rendering apparatus 400 may be connected with each other without the storage apparatus 300.

[Method of Generating Three-Dimensional Shape Data]

Figure 4A:
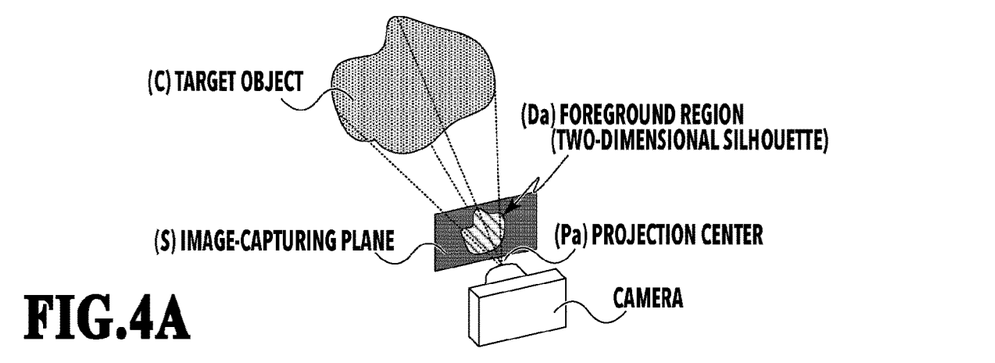
FIGS. 4A to 4C are diagrams describing a method of generating a three-dimensional model by volume intersection.
Figure 4B:
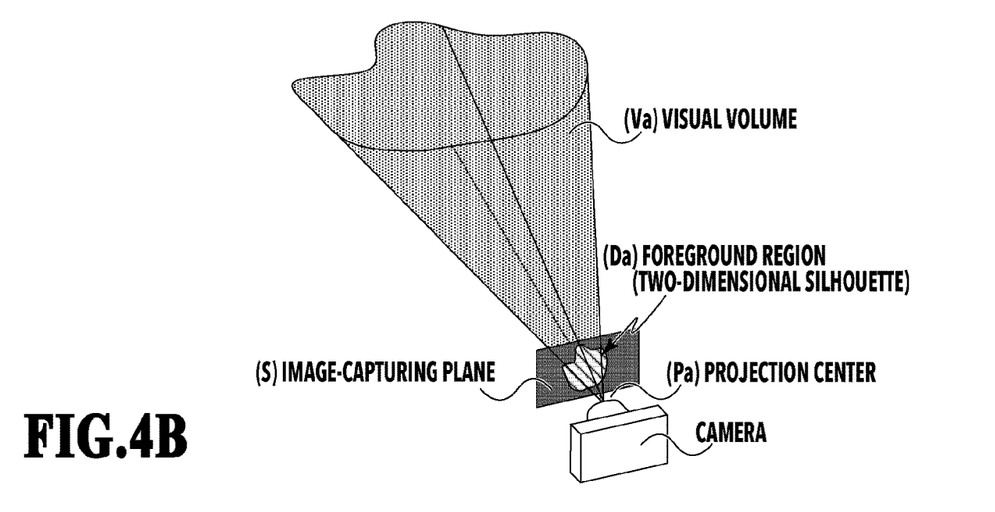
Figure 4C:
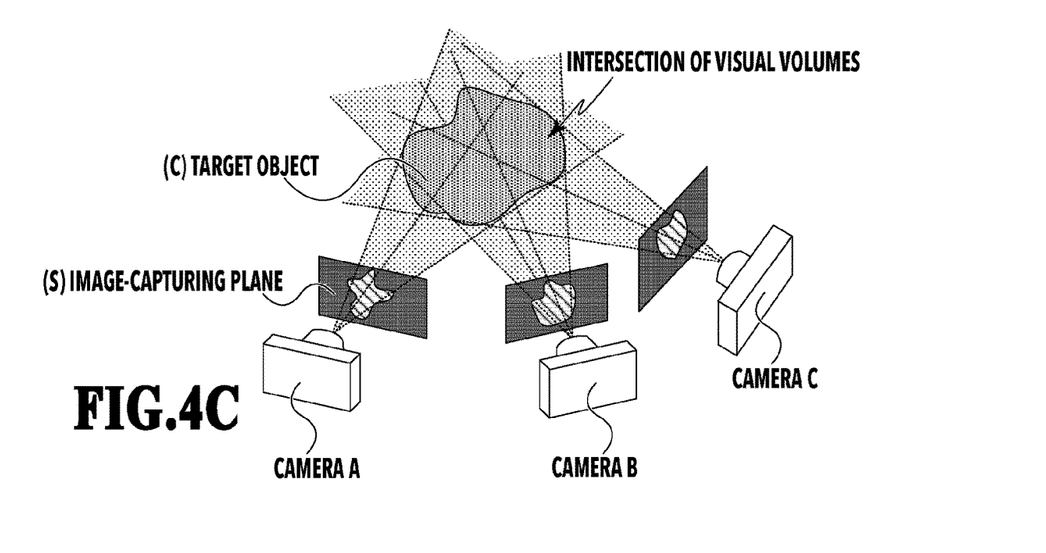

FIGS. 4A to 4C are diagrams illustrating a basic principle of the visual hull. An overview of the visual hull used to generate the three-dimensional model is described with reference to FIGS. 4A to 4C. The visual hull is a method that allows for higher-speed processing with lower accuracy in a concave in principle than a method of generating a three-dimensional model based on the positional relationship between the feature amounts obtained by matching feature amounts calculated from images from image capturing apparatuses. Note that, in either case of the visual hull and the method using matching of feature amounts, as the number of the image capturing apparatuses arranged around is increased, the accuracy of the three-dimensional model is improved, but the image data amount image-captured by the image capturing apparatuses is increased.

FIG. 4A is a diagram in a case where the image capturing apparatus captures an image of a target object C as the object. As described above, the silhouette image including a two-dimensional silhouette (foreground region) of the target object C is obtained by binarization based on a difference in color or luminance between the captured image and the background image obtained by image-capturing the target object C.

FIG. 4B is a diagram illustrating a cone spreading in the three-dimensional space so as to pass through points on the outline of a two-dimensional silhouette Da from a projection center (Pa) of the image capturing apparatus. This cone is called a visual volume Va obtained by the image capturing apparatus. FIG. 4C is a diagram illustrating a state where the three-dimensional model of the object is obtained by multiple visual volumes. As illustrated in FIG. 4C, multiple visual volumes of the corresponding image capturing apparatuses are obtained based on two-dimensional silhouettes Da based on images that are image-captured with synchronization by multiple different image capturing apparatuses at different positions. In the generation of the three-dimensional model by the visual hull, the three-dimensional model of the target body is generated by obtaining an intersection (common region) of the visual volumes corresponding to the multiple image capturing apparatuses. The three-dimensional model to be generated is represented by an aggregate of voxels.

A computing algorithm by the visual hull may include a volume intersection method (VIM) and a space carving method (SCM), for example. In the present embodiment, descriptions are given assuming that the three-dimensional model generation unit 204 uses the SCM.

Figure 5A:
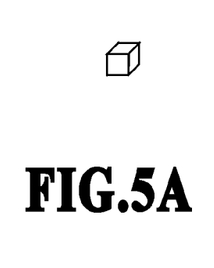
FIGS. 5A to 5D are diagrams describing a three-dimensional model of a foreground by a voxel.
Figure 5B:
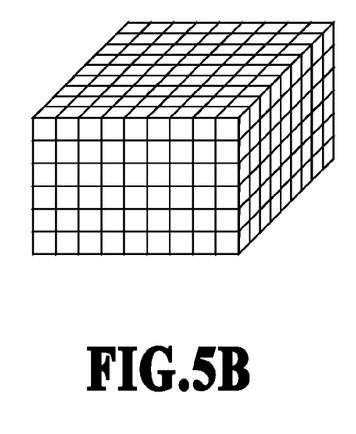
Figure 5C:
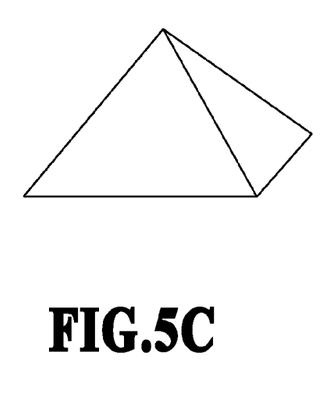
Figure 5D:
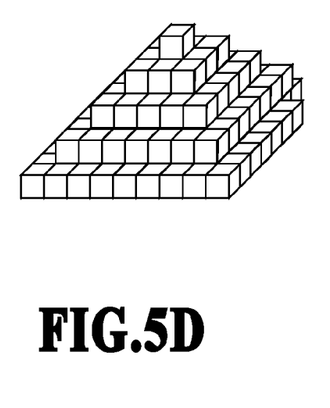

FIGS. 5A to 5D are diagrams describing an overview of the generation of the three-dimensional model by the three-dimensional model generation unit 204. FIG. 5A is a diagram illustrating a voxel, and the voxel is a minimum cube as illustrated in FIG. 5A. As illustrated in FIG. 5B, a generation target space for generating the three-dimensional model is filled with voxels. In the SCM, determination processing to determine whether the voxel is inside or outside the silhouette is performed. In the determination processing, in a case of back-projecting the individual voxels in the generation target space onto planes of the image capturing apparatuses 101, a voxel that is back-projected onto the inside of the foreground regions (silhouettes) of all the image capturing apparatuses 101 is left as the foreground, and the rest are deleted. A threshold may be set so as to determine that the number, which is equal to or greater than the threshold, of the voxels back-projected onto the inside of the foreground regions (silhouettes) of the image capturing apparatuses are left. Thus, with the voxels that are not included in the foreground region of the silhouette image deleted, the three-dimensional model of the object of a quadrangular cone illustrated in FIG. 5C is generated by the voxels as illustrated in FIG. 5D.

In a case where an abnormality is detected in the image capturing apparatus, it can be considered that the three-dimensional model is generated based on the common region of the visual volumes corresponding to the image capturing apparatuses other than the image capturing apparatus in which the abnormality is detected. The three-dimensional model generated in this case may be generated with a shape partially different from that of the three-dimensional model generated by using the common region of the visual volumes of all the image capturing apparatuses in a case where no abnormality is detected in all the image capturing apparatuses. Additionally, also in a case where the three-dimensional model is generated by using the complementary data instead of the silhouette image corresponding to the image capturing apparatus in which an abnormality is detected, the three-dimensional model may be generated with a partially different shape of the object from a normal case.

[Flow of Processing to Generate Three-Dimensional Model]

Figure 6:
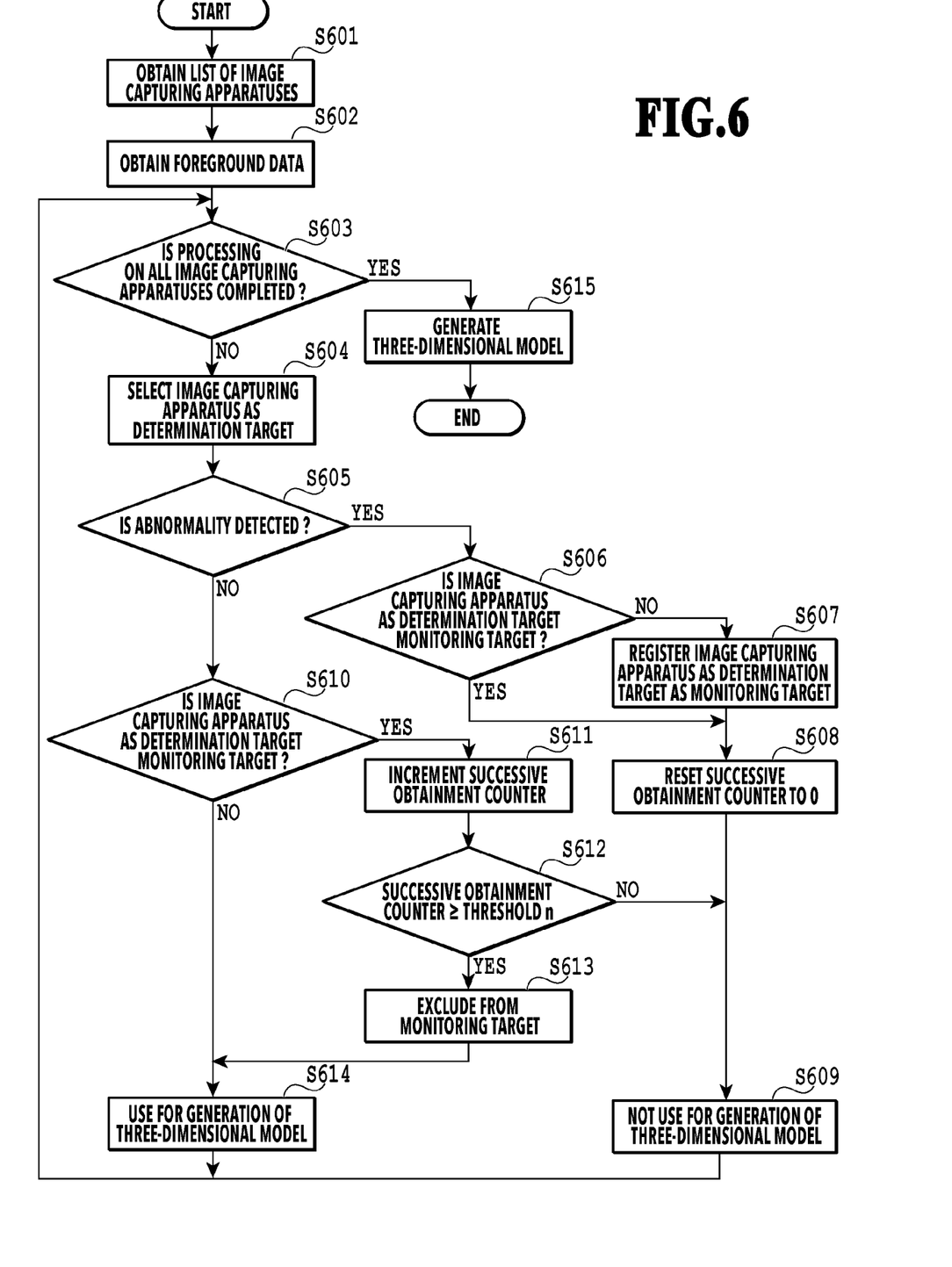
FIG. 6 is a flowchart describing processing of generating the three-dimensional model.

FIG. 6 is a flowchart describing an example of processing in the present embodiment to generate the three-dimensional model of the object in the generation target space. The series of processing indicated in the flowchart of FIG. 6 is performed by the CPU of the three-dimensional model generation apparatus 200 deploying and executing a program code stored in the ROM into the RAM. Additionally, a part of or all the functions of the steps in FIG. 6 may be implemented by hardware such as an ASIC and an electronic circuit. Note that, a sign "S" in the descriptions of each processing means a step in the flowchart.

In S601, the camera identification unit 202 obtains a list of the image capturing apparatuses 101 included in the image processing system 100. In a case where the foreground extraction apparatuses 102 corresponding to the image capturing apparatuses 101 are included like the system configuration in FIG. 1, a list of the foreground extraction apparatuses 102 included in the image processing system 100 may be obtained.

In S602, the foreground data obtainment unit 201 receives the foreground data of one frame from the multiple foreground extraction apparatuses 102. Note that, in the following steps, a case of generating the three-dimensional model corresponding to one frame as the processing target obtained in S602 is described.

S603 to S614 are loop processing, and out of the foreground data corresponding to the image capturing apparatuses of one frame as the processing target obtained in S602, the foreground data to be used to generate the three-dimensional model or the virtual viewpoint image is determined by repeating the loop processing. In other words, out of the foreground data of one frame corresponding to the image capturing apparatuses, the foreground data that is not used to generate the three-dimensional model or the virtual viewpoint image is determined. In the first loop processing, in principle, it is determined as NO in S603, and the processing proceeds to S604.

In S604, out of the image capturing apparatuses included in the list of the image capturing apparatuses 101 that is obtained in S601, the image capturing apparatus as the determination target is selected. Then, processing from S605 to S614 is performed on the image capturing apparatus as the determination target.

Once the image capturing apparatus as the determination target is selected in S604, the processing proceeds to S605. In S605, the camera identification unit 202 determines whether the foreground data that corresponds to the image capturing apparatus as the determination target and corresponds to the frame as the processing target is not obtained.

For example, if the three-dimensional model generation apparatus 200 could not obtain the foreground data corresponding to the image capturing apparatus as the determination target even though there is the object in the region image-captured by the image capturing apparatus as the determination target, the camera identification unit 202 determines that the foreground data is not obtained. For example, if the image capturing apparatus as the determination target could not output the frame as the processing target, the foreground data is not generated, and thus it is determined that the foreground data is not obtained.

Alternatively, in S605, it is also possible to determine whether an abnormality related to the foreground data of the frame as the processing target corresponding to the image capturing apparatus as the determination target is detected. In this case, the detected abnormality includes a case where the foreground data is not obtained. In the descriptions below, descriptions are given assuming that determination on whether the abnormality related to the frame as the processing target of the image capturing apparatus as the determination target is detected is performed in S605.

The image capturing apparatus 101 or the foreground extraction apparatus 102 may be configured to transmit internal error information indicating contents of an error to the three-dimensional model generation apparatus 200 in a case where the error occurs in the image capturing apparatus 101 or the foreground extraction apparatus 102. In a case where the camera identification unit 202 receives the internal error information from the image capturing apparatus 101 or the foreground extraction apparatus 102, the camera identification unit 202 may detect the abnormality related to the foreground data corresponding to the image capturing apparatus as the determination target based on the contents of the received error. Additionally, the foreground extraction apparatus 102 may be controlled so as not to transmit the foreground data in a case where the internal error information is transmitted.

As an example of the error transmitted by the foreground extraction apparatus 102, the internal error may include a program error, an error for a case of object extraction, and an error of a failure in transmission due to a large data size. For example, the foreground extraction apparatus 102 may be configured to transmit the error for a case of object extraction if the percentage of the size of the foreground region extracted by the foreground extraction apparatus 102 (percentage in the entire screen) is greater than a predetermined value.

Additionally, the camera identification unit 202 may be configured to be able to detect an abnormality that occurs after the foreground data is transmitted based on packet loss information on a transmission route. Thus, the foreground data in which the abnormality occurs or the foreground data that the three-dimensional model generation apparatus 200 could not obtain can be identified by performing the determination processing on whether the abnormality is detected in relation to the image capturing apparatus as the determination target.

If the abnormality related to the foreground data corresponding to the image capturing apparatus 101 as the determination target is detected (YES in S605), the processing proceeds to S606. In S606, the monitoring unit 203 obtains the information on the image capturing apparatus 101 as the determination target from the camera identification unit 202 and determines whether the image capturing apparatus 101 as the determination target is the image capturing apparatus as the monitoring target.

If the image capturing apparatus 101 as the determination target is not the image capturing apparatus as the monitoring target (NO in S606), in S607, the monitoring unit 203 adds the image capturing apparatus as the determination target onto a monitoring target list so as to register the image capturing apparatus as the determination target as a new monitoring target. Then, the processing proceeds to S608, and the monitoring unit 203 initializes a successive obtainment counter of the image capturing apparatus 101 as the determination target to 0.

The three-dimensional model generation apparatus 200 includes the successive obtainment counter associated with the multiple image capturing apparatuses 101a to 101d included in the image processing system 100. The successive obtainment counter is a counter for holding the number of the foreground data based on the frame of one image capturing apparatus that have no abnormality detected successively in terms of time. Thus, in a case where the abnormality is detected, the successive obtainment counter is reset to 0.

If the image capturing apparatus 101 as the determination target is registered as the monitoring target (YES in S606), the processing proceeds to S608, and the monitoring unit 203 initializes the successive obtainment counter of the image capturing apparatus 101 as the determination target to 0. Then, once the processing in S608 ends, the processing proceeds to S609.

In S609, in a case where the foreground data of the image capturing apparatus 101 as the determination target is obtained in S602, the camera identification unit 202 performs setting such that the foreground data as the determination target is not used for generation of the three-dimensional model corresponding to the frame as the processing target.

For example, the camera identification unit 202 attaches information to the foreground data corresponding to the frame as the processing target in the image capturing apparatus 101 as the determination target. The attached information is indicating that it is the foreground data that is not used for generation of the three-dimensional model. Alternatively, the camera identification unit 202 may hold a table including information (records) associated with the list of the image capturing apparatuses 101 and a flag indicating whether to use the foreground data for generation of the three-dimensional model. Then, in S609, the camera identification unit 202 may update the table by providing a flag indicating that the foreground data is not used for generation of the three-dimensional model into the records of the image capturing apparatus 101 as the determination target in the table. Thus, the foreground data corresponding to the image capturing apparatus as the determination target can be prevented from being used for generation of the three-dimensional model in a case where the abnormality related to the foreground data corresponding to the image capturing apparatus as the determination target is detected.

Note that, the processing in S609 is processing to prevent the foreground data corresponding to the image capturing apparatus as the monitoring target from being used with no change for generation of the three-dimensional model. Even in a case of the image capturing apparatus as the monitoring target, if the three-dimensional model generation apparatus 200 could normally obtain the foreground data, the frame complementary unit 206 may generate the complementary data based on the foreground data.

On the other hand, if the abnormality related to the foreground data corresponding to the image capturing apparatus as the determination target is not detected (NO in S605), the processing proceeds to S610, and the monitoring unit 203 determines whether the image capturing apparatus 101 as the determination target is registered as the monitoring target. For example, the monitoring unit 203 determines whether the image capturing apparatus as the determination target is registered on the monitoring target list.

If the image capturing apparatus 101 as the determination target is registered as the monitoring target (YES in S610), in S611, the monitoring unit 203 increments and updates the value of the successive obtainment counter by adding 1 to the value of the successive obtainment counter of the image capturing apparatus 101 as the determination target.

Then, the processing proceeds to S612, and the monitoring unit 203 compares the value of the successive obtainment counter of the image capturing apparatus 101 as the determination target with a threshold n set in advance.

If the value of the successive obtainment counter of the image capturing apparatus as the determination target is smaller than the threshold (NO in S612), the processing proceeds to S609. Then, the camera identification unit 202 performs setting such that the foreground data corresponding to the image capturing apparatus 101 as the determination target obtained in S602 is not used for generation of the three-dimensional model corresponding to the frame as the processing target.

In a case where the value of the successive obtainment counter is smaller than the value of the threshold n, although the abnormality related to the foreground data based on the frame of this time is not detected, it is determined that the period in which the foreground data with no abnormality is obtained is short and unstable. Thus, even in a case where the foreground data in which no abnormality is detected is obtained, the processing proceeds to S609 if it is determined as NO is S612, and the processing is performed such that the foreground data based on the current frame as the processing target is not used for generation of the three-dimensional model.

For example, assuming that one frame of a normal silhouette image corresponding to one image capturing apparatus and one frame of an abnormal silhouette image corresponding to the image capturing apparatus are alternately transmitted to the three-dimensional model generation apparatus 200 repeatedly. In a case where an abnormality in the silhouette image is detected, the three-dimensional model is generated based on only the normal silhouette image or based on the normal silhouette image and the complementary data. The three-dimensional model generated in this case may be generated such that the shape of the three-dimensional shape is partially different from that in a normal case. Thus, even in a case of a still object, three-dimensional models of different shapes may be generated for each frame. If those three-dimensional models are displayed in chronological order to be displayed as a moving image, the portion of the different shape may be displayed to be blinking, or flickering may occur, and it may provide the viewer with a feeling of strangeness.

Thus, in the present embodiment, even in a case where the foreground data could be normally obtained from the foreground extraction apparatus 102 corresponding to the image capturing apparatus 101 as the monitoring target, the image capturing apparatus is not excluded from the monitoring target until successive obtainment of normal foreground data of a predetermined number of frames is confirmed. That is, the foreground data of the image capturing apparatus as the monitoring target is not used for generation of the three-dimensional model until the frame satisfies predetermined conditions indicating that normal foreground data is received stably from the image capturing apparatus 101 as the monitoring target. Thus, in the present embodiment, a part of the three-dimensional shape represented by the three-dimensional model is not varied in a short time, and the feeling of strangeness provided to the user (viewer) in a case where the generated three-dimensional models are reproduced in chronological order can be reduced.

On the other hand, if the value of the successive obtainment counter is equal to or greater than the threshold (YES in S612), the processing proceeds to S613. In this case, the monitoring unit 203 excludes the image capturing apparatus as the determination target from the monitoring target list.

Then, the processing proceeds to S614, and the camera identification unit 202 performs setting such that the foreground data corresponding to the image capturing apparatus 101 as the determination target obtained in S602 is used for generation of the three-dimensional model. If the value of the successive obtainment counter is equal to or greater than the threshold n, it can be considered that the foreground data corresponding to the image capturing apparatus as the determination target is obtained stably; thus, the processing is performed such that the foreground data is used for generation of the three-dimensional model.

Note that, in a case where the image capturing apparatus as the processing target is excluded from the monitoring target in S613 because it is determined that the value of the successive obtainment counter is greater than the threshold in S612, the setting of the foreground data corresponding a previous frame may be changed such that the foreground data is used for generation of the three-dimensional model. For example, before the exclusion from the monitoring target, the setting of the foreground data in which no abnormality is detected successively by the number of the threshold n may be changed to be usable for generation of the three-dimensional model.

Additionally, in S612, it is determined whether to perform the exclusion from the monitoring target by comparing the value of the successive obtainment counter with the threshold n set in advance; however, the threshold n used in S612 may be changed depending on the type of a cause of the abnormality related to the foreground data. For example, in a case where recovery from the abnormality is expected to be early, the threshold n may be changed to be small. Alternatively, in a case where recovery from the abnormality is expected to be late, the threshold n may be changed to be great. Additionally, the past monitoring history including causes of occurrence of the abnormality in the foreground data may be managed, and the threshold n may be changed to be great if it is the same cause as a cause of past occurrence.

In addition, as the threshold n used for the determination in S612, different values for each of the multiple image capturing apparatuses 101a to 101d may be set. For example, importance information may be provided to the list of the image capturing apparatuses 101 or the foreground extraction apparatuses 102 obtained in S601. Then, in a case of the image capturing apparatus 101 (foreground extraction apparatus 102) with a high importance, the threshold n may be changed to be smaller than a case of the image capturing apparatus 101 (foreground extraction apparatus 102) with a low importance. The list of the image capturing apparatuses 101 may include the threshold n for each image capturing apparatus.

Alternatively, it may be constantly determined as NO in S612 such that the image capturing apparatus cannot be excluded from the monitoring target in a case where a cause of the detected abnormality is identified and it is identified that the detected abnormality occurs due to an unrecoverable cause. For example, in a case where error recovery during image capturing is difficult and recovery by a remote operation is impossible because it is circuit abnormality, cable disconnection, or the like in an apparatus, it is determined that an abnormality occurs because of a cause that is unrecoverable from the abnormality. In this case, since the three-dimensional model generation apparatus 200 cannot receive an error, whether it is an abnormality due to an unrecoverable cause is determined based on information other than an error.

On the other hand, in S610, if it is determined that the image capturing apparatus 101 as the determination target is not registered as the monitoring target (NO in S610), the image capturing apparatus as the determination target is not the image capturing apparatus as the monitoring target and also no abnormality related to the foreground data is detected; thus, the processing proceeds to S614. Then, setting is performed such that the foreground data corresponding to the image capturing apparatus 101 as the determination target is used for generation of the three-dimensional model.

After S609 or S614 ends, the processing returns to S603, and it is determined whether the processing on all the image capturing apparatuses 101 ends based on the list information on the image capturing apparatuses 101 obtained in S601. If the processing on all the image capturing apparatuses 101 does not end yet (NO in S603), the processing proceeds to S604 again, and the image capturing apparatus as the determination target is selected from the image capturing apparatuses not determined yet to repeat the processing from S605 to S614 and S609. If the processing on all the image capturing apparatuses 101 ends (YES in S603), the processing proceeds to S615.

In S615, the three-dimensional model generation unit 204 generates the three-dimensional model of the frame as the processing target by using the silhouette image from the image capturing apparatus set to be generated into the three-dimensional model out of the silhouette images based on the frames as the processing target obtained in S602. That is, the three-dimensional model is generated by using the silhouette image corresponding to the image capturing apparatus other than the image capturing apparatus as the monitoring target.

As described above, the three-dimensional model generation unit 204 may generate the three-dimensional model so as to obtain the common region of the visual volumes of the image capturing apparatuses that are set to generate the three-dimensional model. Alternatively, the three-dimensional model may be generated by using the complementary data generated by the frame complementary unit 206 instead of the silhouette image corresponding to the image capturing apparatus 101 as the monitoring target that is set so as not to be used for generation of the three-dimensional model.

In a case where the image capturing apparatuses 101a to 101d capture a moving image, the foreground data is generated for each frame forming the moving image. Thus, if there is the next frame, the processing from S602 to S615 is repeated, and in the next S602, the foreground data based on the next frame is obtained. With repeating of the steps of the processing in the present flowchart every time the foreground data of one frame is obtained, the three-dimensional model corresponding to the frame forming the moving image is generated and saved in the storage apparatus 300.

The rendering unit 401 of the rendering apparatus 400 selects the texture image based on the additional information set to the foreground data transmitted from the foreground extraction apparatus 102 and colors the three-dimensional model.

For example, once the coloring is performed with the texture image in a case where one frame of a normal texture image corresponding to one image capturing apparatus and one frame of an abnormal texture image corresponding to the image capturing apparatus are alternately transmitted repeatedly, the color difference in each frame may be varied, and it may provide the viewer with a feeling of strangeness. Thus, the rendering unit 401 may perform coloring by not using the texture image corresponding to the image capturing apparatus 101 as the monitoring target but using the texture image corresponding to the image capturing apparatus other than the monitoring target. With no use of the texture image generated by the foreground extraction apparatus 102 corresponding to the image capturing apparatus as the monitoring target, the color difference is not varied in a short time, and thus the feeling of strangeness in the virtual viewpoint image that occurs in a case of reproduction in chronological order can be reduced.

As described above, according to the present embodiment, the obtained foreground data is not used for generation of the three-dimensional model or the virtual viewpoint image until normal foreground data can be obtained stably. Thus, according to the present embodiment, the feeling of strangeness felt by the user in a case where the three-dimensional model or the virtual viewpoint image is reproduced in chronological order can be reduced.

Note that, depending on the contents of the error of a failure in transmission of the foreground data, the foreground extraction apparatus 102 may stop transmission of the foreground data for a period that is set for each error cause even if it is possible to recover from the error. Thus, with this control, the data amount transmitted from the multiple foreground extraction apparatuses 102 can be reduced, and a network load between the foreground extraction apparatuses 102 and the three-dimensional model generation apparatus 200 can be reduced. In this case, it is possible to increase the data amount from another foreground extraction apparatus 102 by using the vacant bandwidth.

According to the technique of the present disclosure, even in a case where an abnormality in an image used for generation of three-dimensional shape data is detected, a feeling of strangeness during display of the three-dimensional shape data in chronological order can be reduced.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-199234 filed Dec. 8, 2021, which are hereby incorporated by reference wherein in their entirety.

What is claimed is:

1. An image processing apparatus comprising:
one or more memories storing instructions; and
one or more processors executing the instructions to:
obtain a silhouette image representing a region of an object corresponding to a frame of a moving image in units of frames for each of a plurality of image capturing apparatuses;
detect a frame in which the silhouette image cannot be obtained;
register, as a monitoring target, an image capturing apparatus in which the silhouette image cannot be obtained out of the plurality of image capturing apparatuses in the detected frame;
count frames successively in order of frames in a case where no abnormality is detected from the silhouette image obtained from the image capturing apparatus registered as the monitoring target, and reset a counted number of frames in a case where an abnormality is detected from the silhouette image obtained from the image capturing apparatus registered as the monitoring target;
exclude the image capturing apparatus registered as the monitoring target from the monitoring target in a case where the counted number of frames is equal to or greater than a predetermined number; and
generate three-dimensional shape data of the object in units of frames by using a plurality of silhouette images corresponding to the plurality of image capturing apparatuses,
wherein in generation of the three-dimensional shape data of the object, during a period in which at least one of the plurality of image capturing apparatuses is registered as the monitoring target, even in a case where no abnormality is detected from the silhouette image obtained from the image capturing apparatus registered as the monitoring target, the silhouette image obtained from the image capturing apparatus registered as the monitoring target is not used and the silhouette image corresponding to an image capturing apparatus other than the image capturing apparatus registered as the monitoring target out of the plurality of image capturing apparatuses is used,
wherein the predetermined number is changed based on a type of a cause of the abnormality, and the predetermined number is determined based on a time length of recovery from the abnormality.

2. The image processing apparatus according to claim 1, further comprising:
one or more processors executing the instructions to:
generate an image to be a replacement for the image corresponding to the image capturing apparatus registered as the monitoring target, wherein
in a case of generating the three-dimensional shape data in a plurality of frames corresponding to the period, the three-dimensional shape data is generated by using the silhouette image corresponding to the image capturing apparatus other than the image capturing apparatus registered as the monitoring target and the image to be a replacement for the silhouette image corresponding to the image capturing apparatus registered as the monitoring target.

3. The image processing apparatus according to claim 2, wherein
the image to be a replacement for the silhouette image corresponding to the image capturing apparatus registered as the monitoring target is generated based on the silhouette image in a case where the silhouette image corresponding to the image capturing apparatus registered as the monitoring target is obtained.

4. The image processing apparatus according to claim 2, wherein
the image to be a replacement for the silhouette image corresponding to the image capturing apparatus registered as the monitoring target is generated based on a frame of the image capturing apparatus in a case of not being registered as the monitoring target.

5. The image processing apparatus according to claim 2, wherein
an image in which an entire area represents the region of the object is generated as the image to be a replacement for the silhouette image corresponding to the image capturing apparatus registered as the monitoring target.

6. The image processing apparatus according to claim 1, further comprising:
one or more processors executing the instructions to:
extract the region of the object from the frames forming the moving image obtained by image-capturing by each of the plurality of image capturing apparatuses;
generate data including the silhouette image corresponding to each of the plurality of image capturing apparatus; and
in a case where the silhouette image is not generated, not output the data based on a frame corresponding to a period set in advance.

7. The image processing apparatus according to claim 1, further comprising:
one or more processors executing the instructions to:
obtain a texture image representing texture of the object corresponding to the frame of the moving image in units of frames for each of the plurality of image capturing apparatuses,
wherein in a case where a virtual viewpoint image is generated by coloring the three-dimensional shape data of the object,
the texture image corresponding to the image capturing apparatus registered as the monitoring target is not used during the period, and
in the period, coloring is performed by using the texture image corresponding to an image capturing apparatus other than the image capturing apparatus registered as the monitoring target out of the plurality of image capturing apparatuses.

8. The image processing apparatus according to claim 1, wherein
the three-dimensional shape data is generated by a visual hull.

9. The image processing apparatus according to claim 1, wherein an importance is set to each of the plurality of image capturing apparatuses, and
wherein the predetermined number is individually set for each of the plurality of image capturing apparatuses, and the predetermined number for at least one of the plurality of image capturing apparatuses is further determined based on the importance of each of the plurality of image capturing apparatuses.

10. The image processing apparatus according to claim 1, wherein
during the period in which the at least one of the plurality of image capturing apparatuses is registered as the monitoring target, the three-dimensional shape data of the object is generated with reduced accuracy.

11. An image processing method comprising:
obtaining a silhouette image representing a region of an object corresponding to a frame of a moving image in units of frames for each of a plurality of image capturing apparatuses;
detecting a frame in which the silhouette image cannot be obtained;
registering, as a monitoring target, an image capturing apparatus in which the silhouette image cannot be obtained out of the plurality of image capturing apparatuses in the detected frame;
counting frames successively in order of frames in a case where no abnormality is detected from the silhouette image obtained from the image capturing apparatus registered as the monitoring target, and reset a counted number of frames in a case where an abnormality is detected from the silhouette image obtained from the image capturing apparatus registered as the monitoring target;
excluding the image capturing apparatus registered as the monitoring target from the monitoring target in a case where the counted number of frames is equal to or greater than a predetermined number; and
generating three-dimensional shape data of the object in units of frames by using a plurality of silhouette images corresponding to the plurality of image capturing apparatuses, wherein
in generation of the three-dimensional shape data of the object, during a period in which at least one of the plurality of image capturing apparatuses is registered as the monitoring target, even in a case where no abnormality is detected from the silhouette image obtained from the image capturing apparatus registered as the monitoring target, the silhouette image obtained from the image capturing apparatus registered as the monitoring target is not used and the silhouette image corresponding to an image capturing apparatus other than the image capturing apparatus registered as the monitoring target out of the plurality of image capturing apparatuses is used,
wherein the predetermined number is changed based on a type of a cause of the abnormality, and the predetermined number is determined based on a time length of recovery from the abnormality.

12. A non-transitory computer readable storage medium storing a program which causes a computer to perform an image processing method, the image processing method comprising:
obtaining a silhouette image representing a region of an object corresponding to a frame of a moving image in units of frames for each of a plurality of image capturing apparatuses;
detecting a frame in which the silhouette image cannot be obtained;
registering, as a monitoring target, an image capturing apparatus in which the silhouette image cannot be obtained out of the plurality of image capturing apparatuses in the detected frame;
counting frames successively in order of frames in a case where no abnormality is detected from the silhouette image obtained from the image capturing apparatus registered as the monitoring target, and reset a counted number of frames in a case where an abnormality is detected from the silhouette image obtained from the image capturing apparatus registered as the monitoring target;
excluding the image capturing apparatus registered as the monitoring target from the monitoring target in a case where the counted number of frames is equal to or greater than a predetermined number; and generating three-dimensional shape data of the object in units of frames by using a plurality of silhouette images corresponding to the plurality of image capturing apparatuses, wherein
    in generation of the three-dimensional shape data of the object, during a period in which at least one of the plurality of image capturing apparatuses is registered as the monitoring target, even in a case where no abnormality is detected from the silhouette image obtained from the image capturing apparatus registered as the monitoring target, the silhouette image obtained from the image capturing apparatus registered as the monitoring target is not used, and the silhouette image corresponding to an image capturing apparatus other than the image capturing apparatus registered as the monitoring target out of the plurality of image capturing apparatuses is used,
wherein the predetermined number is changed based on a type of a cause of the abnormality, and the predetermined number is determined based on a time length of recovery from the abnormality.

13. An image processing apparatus comprising:
one or more memories storing instructions; and
one or more processors executing the instructions to:
    obtain a silhouette image representing a region of an object corresponding to a frame of a moving image in units of frames for each of a plurality of image capturing apparatuses, in order of frames;
    detect a frame in which the silhouette image cannot be obtained;
    register, as a monitoring target, an image capturing apparatus in which the silhouette image cannot be obtained out of the plurality of image capturing apparatuses in the detected frame;
    count frames successively in order of frames in a case where no abnormality is detected from the silhouette image obtained from the image capturing apparatus registered as the monitoring target, and reset a counted number of frames in a case where an abnormality is detected from the silhouette image obtained from the image capturing apparatus registered as the monitoring target;
    exclude the image capturing apparatus registered as the monitoring target from the monitoring target in a case where the counted number of frames is equal to or greater than a predetermined number;
    generate three-dimensional shape data of the object in units of frames by using a plurality of silhouette images corresponding to the plurality of image capturing apparatuses; and
    generate a moving image based on the three-dimensional shape data generated in units of frames,
wherein in generation of the three-dimensional shape data of the object, during a period in which at least one of the plurality of image capturing apparatuses is registered as the monitoring target, even in a case where no abnormality is detected from the silhouette image obtained from the image capturing apparatus registered as the monitoring target, the silhouette image obtained from the image capturing apparatus registered as the monitoring target is not used and the silhouette image corresponding to an image capturing apparatus other than the image capturing apparatus registered as the monitoring target out of the plurality of image capturing apparatuses is used, and
wherein the predetermined number is changed based on a type of a cause of the abnormality, and the predetermined number is determined based on a time length of recovery from the abnormality.

14. The image processing apparatus according to claim 13, wherein
the moving image is a virtual viewpoint image as a moving image.

* * * * *